Patented Feb. 4, 1947

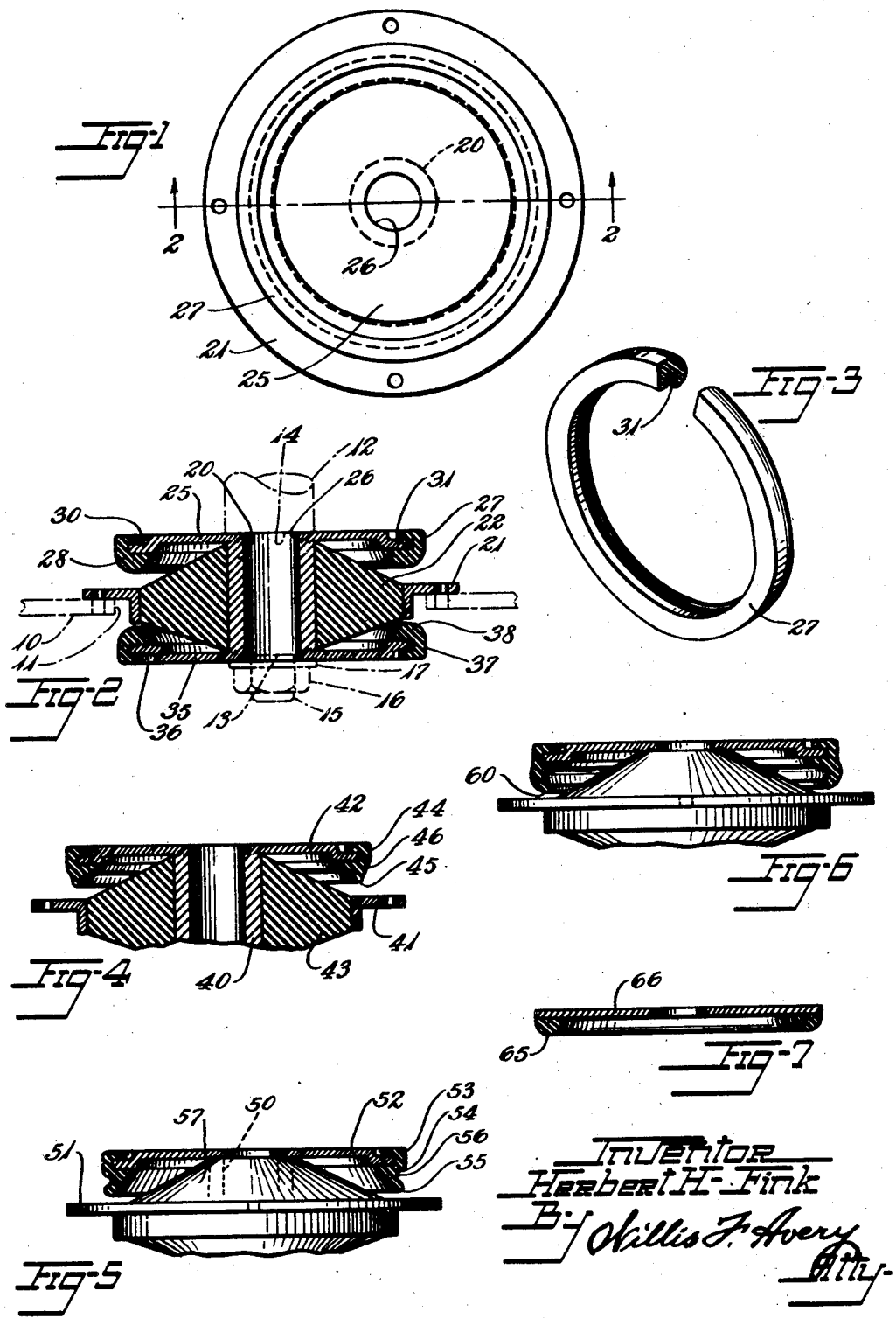

2,415,280

UNITED STATES PATENT OFFICE 2,415,280

SNUBBER FOR RESILIENT MOUNTING

Herbert H. Fink, Akron, Ohio, assignor to The B. F. Goodrich Company, New York, N. Y., a corporation of New York Application March 20, 1943, Serial No. 479,901

12 Claims. (Cl. 248—358)

This invention relates to vibration insulation and is especially useful in the resilient supporting of instruments and machines. More particularly, the invention provides an improved snubber and improved snubbing action to cushion and limit springing deflection and to provide for varying the rate of the deflection, where desired.

The principal objects of the invention are to provide effectively for resilient cushioning throughout a desired range of deflection and increased resistance to greater deflection; to provide for effective snubbing to prevent excessive deflection; to provide for variable rate deflection; to provide for conveniently altering the rate and snubbing characteristics of the mounting; to provide for conveniently exchanging snubbers on the same mounting, to prevent any metal to metal contact, and to provide simplicity of construction, reliability of operation, and convenience of manufacture and assembly.

These and other objects will appear from the following description and the accompanying drawing.

Of the drawing:

Fig. 1 is a plan view of a vibration insulator or resilient mounting constructed in accordance with and embodying the invention.

Fig. 2 is a cross-section thereof, taken on line 2—2 of Fig. 1, supporting and supported structures being indicated in dot-and-dash lines.

Fig. 3 is a perspective view of one of the cushioning elements or snubbers, parts being broken away.

Fig. 4 is a cross-sectional view, like Fig. 3, showing a modification, parts being broken away.

Fig. 5 is a side view partly in section showing another modification, parts being broken away.

Fig. 6 is a view, like Fig. 5, showing a further modification.

Fig. 7 is a sectional view showing still a further modification of the snubber.

In accordance with the invention, referring first to the embodiment shown in Figs. 1 to 3, an instrument or machine to be supported from a supporting structure such as the frame 10, having an aperture 11 therethrough, is provided with a post 12 having a portion 13 of reduced diameter extending from a shoulder 14 and terminating in a threaded portion 15 engaged by a retaining nut 16 and washer 17.

For supporting the post 12 from the frame 10 resiliently against vibration, a spool-like supported member having a neck or tubular sleeve 20 is provided to slip over the reduced portion 13 of the post, a supporting member 21 is provided surrounding the sleeve, and a cushion body 22 of vulcanized soft rubber or other rubber-like material is provided between the sleeve and the supporting member and secured thereto preferably by a vulcanized bond.

The supporting member 21 is preferably circular although a polygonal member may be employed if desired, and is preferably of L-shape in cross-section with the cushion body secured to the inner vertical leg of the frame. The sleeve 20 is preferably cylindrical with the cushion body secured to its vertical outer surface so that the load is supported by the cushion body principally or entirely in shear stress. The cushion body is preferably of annular circular form with oppositely directed conical top and bottom surfaces so that its thickness increases progressively from the outer member 21 toward the inner member 20. These surfaces may, however, be curved in cross-section if desired to provide any desired physical characteristics.

For snubbing or cushioning excessive loads in a downward direction, an end of the spool-like member, in the form of a metal plate or disc 25 having an aperture 26 adapted to receive the reduced portion 13 of the post, is provided at the upper end of the sleeve 20, and may be made separately and secured thereto as by welding, brazing, soldering or other fastening means, or it may be held in place in the manner of a washer. Its periphery is preferably greater than the opening of the supporting member 21 and a cushioning or snubber element preferably formed as a ring 27 of resilient soft vulcanized rubber or other rubber-like material is secured about its periphery so as to provide an annular downwardly extending cushion 28 over the supporting member 21 and adapted to engage the member upon sufficient depression of the post 12.

For conveniently attaching the cushion 28 to the disc 25 without its extending above and occupying space unnecessarily over the upper face of the disc, and also to strengthen the rim of the disc, the peripheral margin 30 of the disc is offset downwardly and the cushioning ring 27 is formed with an annular groove or recess 31 on its inner periphery for receiving the margin of the disc, enabling the ring 27 to be snapped over the margin without projecting above the upper face of the body of the disc, and permitting convenient removal and application of the ring. The cushion portion of the ring extends under the disc and may have a convex face adapted to engage the frame 21 progressively so that the snubbing action will not be too abrupt.

For snubbing or cushioning upwardly directed forces, as in rebound, a spool-end in the form of a disc 35 similar to the spool-end or disc 25 is mounted on the post 12 at the lower end of the sleeve 20 and has an upwardly offset margin 36. A cushioning or snubbing ring 37 of soft vulcanized rubber or other rubber-like material, similar to ring 27 is secured about the periphery of disc 35 and has a convex cushioning portion 38 adapted to engage the lower side of the supporting member 21 when the post 12 is moved upwardly a sufficient distance from its normal position but is normally spaced therefrom. The disc 35 may be mounted or held in place in the same manner as the disc 25.

In use, the supporting member 21 may be secured to its supporting structure 10 as by screws or rivets, the post 12 is inserted through the sleeve 20 and secured to the vibration insulator by the nut 16. The insulator supports the load without contact of the cushioning rings 27, 37 with the supporting member 21 under normal vibrational and static loads. Upon increased downward deflection, the cushion ring is contacted by the member 21 and supports a portion of the load under compression, the resistance to deflection increasing rapidly but progressively as the convex cushion of the ring is loaded. Similarly, any extensive rebound or upwardly directed force causes contact of the cushion ring 37 with the supporting member 21 which provides rapidly but progressively increasing resistance to deflection.

In the modification of Fig. 4, the tubular sleeve 40, supporting member 41, disc 42, and resilient shear cushioning body 43 are similar to the sleeve 20, supporting member 21, disc 25, and resilient body 22 of the vibration insulator of Figs. 1 and 2. The resilient compressible ring 44, however, has a narrow lip 45 extending downwardly from its annular cushioning portion 46 to contact the supporting member 41 in advance of the wider body of the cushioning element and offers less initial resistance to compressive distortion. As the load increases the lip is flattened and the wider portion 46 becomes effective to increase resistance to distortion. This extends the range of snubbing action and in effect alters the rate of the mounting through a part of the deflection range.

In the modification shown in Fig. 5, the tubular sleeve 50, supporting member 51, disc 52, and shear cushioning body 57 are similar to those of Figs. 1 to 4. The resilient compressible ring 53, however, has a body portion 54 subject to compression, and an angularly disposed lip 55 integral therewith and extending therefrom outwardly. The outer wall of the lip may have a groove 56 to reduce stiffness. In this form of the invention, the load is carried by the body 57 acting in shear stress until the lip 55 engages the member 51. Thereafter the lip is deflected by bending and consequent circumferential stretch of the lip until the groove 56 is closed, whereupon the body 54 of the ring with the flattened lip is subjected to compressive distortion.

The form of the invention shown in Fig. 6 is similar to that of Fig. 5 except that the lip 60 turns inwardly and in use is subjected to combined bending and consequent circumferential compression for progressively increased resistance to deflection.

In Fig. 7 the cushioning ring 65 is bonded to a margin of the disc 66 and no offset of the margin is provided. Any of the cushioning rings shown may be bonded to their metal discs if desired and this may be accomplished by brass plating the metal disc and molding and vulcanizing the cushion thereto, or by the use of adhesive cements.

The embodiments of Figs. 1 to 6, wherein the snubber is such that it can be simply snapped in place and be easily removed, has the advantages of facilitating selection, change or removal of the snubber where it is desired to alter the action of the mounting.

While the metal discs have been shown in Figs. 1 to 6 as welded to the sleeve members, the welding may be omitted and the discs held in proper relation to the sleeve members by the post 12 and nut 16 in the manner for example of washers. To facilitate molding of the shear cushioning body it may be molded to the frame and sleeve member before the metal discs are secured to the sleeve member.

Variations may be made without departing from the scope of the invention as it is defined by the following claims.

I claim:

1. A resilient mounting comprising relatively movable supporting and supported structures, a resilient cushioning element connecting said structures, one of the structures including a plate element in opposition to the other structure, and a snubber of resilient rubber-like material at the margin of the plate element spaced in the direction of movement from the other structure in a position to engage the other structure at a determinate place in the range of deflection of the mounting.

2. A resilient mounting comprising relatively movable supporting and supported structures, a resilient cushioning element connecting said structures, one of the structures including a plate element in opposition to the other structure, and a snubber of resilient rubber-like material at the margin of the plate element and comprising a bendable lip in a position to engage the other structure at a determinate place in the range of deflection of the mounting.

3. A resilient mounting comprising relatively movable supporting and supported structures, a resilient cushioning element connecting said structures, one of the structures including a plate element in opposition to the other structure, and an annular snubber of resilient rubber-like material at the margin of the plate element spaced in the direction of movement from the other structure in a position to engage the other structure at a determinate place in the range of deflection of the mounting.

4. A resilient mounting as defined in claim 3 in which said plate element has a depressed margin and said snubber is seated in the depression.

5. A resilient mounting comprising relatively movable supporting and supported structures, a resilient cushioning element connecting said structures, one of the structures including a plate element in opposition to the other structure, and an annular snubber of resilient rubber-like material at the margin of the plate element and including an inwardly converging annular lip in a position to engage the other structure at a determinate place in the range of deflection of the mounting.

6. A resilient mounting comprising relatively movable supporting and supported structures, a resilient cushioning element connecting said structures, one of the structures including a plate element in opposition to the other structure, and an annular snubber of resilient rubber-like material at the margin of the plate element and including an outwardly flared annular lip in a position to engage the other structure at a determinate place in the range of deflection of the mounting.

7. A resilient mounting comprising relatively movable supporting and supported structures, a resilient cushioning element connecting said structures, one of the structures including a plate element in opposition to the other structure, an annular snubber of resilient rubber-like material at the margin of the plate element in a position to engage the other structure at a determinate place in the range of deflection of the mounting, said snubber having an annular groove for receiving the margin of a plate element and a cushioning portion extending obliquely toward the other structure.

8. A resilient mounting comprising relatively movable supporting and supported structures, a resilient cushioning element connecting said structures, one of the structures including a plate element in opposition to the other structure, an annular snubber of resilient rubber-like material at the margin of the plate element in a position to engage the other structure at a determinate place in the range of deflection of the mounting, said snubber having an annular groove for receiving the margin of a plate element to hold the snubber in place by resiliently gripping said margin, and a cushioning portion in the form of a bendable annular lip extending toward the other structure.

9. A snubber for a resilient mounting in which relatively movable supporting and supported structures are connected by a resilient body and one of the structures includes a plate element in opposition to the other structure, said snubber comprising a body of resilient rubber-like material having a recess for receiving a margin of said plate element and having a cushioning portion for snubbing action upon engagement with the other of said structures.

10. A snubber for a resilient mounting in which relatively movable supporting and supported structures are connected by a resilient body and one of the structures includes a plate element in opposition to the other structure, said snubber comprising an annular body of resilient rubber-like material for embracing said plate element about its margin and having a cushioning portion for snubbing action upon engagement with the other of said structures.

11. A snubber for a resilient mounting in which relatively movable supporting and supported structures are connected by a resilient body and one of the structures includes a plate element in opposition to the other structure, said snubber comprising an annular body of resilient rubber-like material for embracing said plate element about its margin and having an annular groove for receiving said margin and a cushioning portion for snubbing action upon engagement with the other of said structures.

12. A snubber for a resilient mounting in which relatively movable supporting and supported structures are connected by a resilient body and one of the structures includes a plate element in opposition to the other structure, said snubber comprising a body of resilient rubber-like material for mounting on said plate element and having an angularly extending bendable cushioning portion for engagement with the other of said structures.

HERBERT H. FINK.

REFERENCES CITED

The following references are of record in the file of this patent:

FOREIGN PATENTS

| Number | Country | Date |
| --- | --- | --- |
| 661,895 | German | June 29, 1938 |